United States Patent
Takahashi

(10) Patent No.: US 11,709,292 B2
(45) Date of Patent: Jul. 25, 2023

(54) OPTICAL PLASTIC PRODUCT, AND PLASTIC SPECTACLE LENS AND SPECTACLES

(71) Applicant: TOKAI OPTICAL CO., LTD., Okazaki (JP)

(72) Inventor: Hirotoshi Takahashi, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 446 days.

(21) Appl. No.: 16/725,034

(22) Filed: Dec. 23, 2019

(65) Prior Publication Data

US 2020/0132886 A1 Apr. 30, 2020

Related U.S. Application Data

(63) Continuation of application No. PCT/JP2018/024050, filed on Jun. 25, 2018.

(30) Foreign Application Priority Data

Jul. 3, 2017 (JP) ................................. 2017-130579

(51) Int. Cl.
*G02B 1/14* (2015.01)
*G02C 7/02* (2006.01)
(Continued)

(52) U.S. Cl.
CPC .......... *G02B 1/14* (2015.01); *B29D 11/00355* (2013.01); *B29D 11/00548* (2013.01); *G02B 1/115* (2013.01); *G02C 7/022* (2013.01)

(58) Field of Classification Search
CPC .... G02B 1/14; G02B 1/115; B29D 11/00355; B29D 11/00548; B29D 11/00009;
(Continued)

(56) References Cited

U.S. PATENT DOCUMENTS 6,250,758 B1 * 6/2001 Yoshihara ............... B32B 15/08
351/159.63
6,972,136 B2 12/2005 Koenig et al.
(Continued)

FOREIGN PATENT DOCUMENTS

CN 101441279 A 5/2009
CN 103282823 A 9/2013
(Continued)

OTHER PUBLICATIONS

International Search Report and Written Opinion (Application No. PCT/JP2018/024050) dated Sep. 25, 2018.
(Continued)

*Primary Examiner* — Darryl J Collins
*Assistant Examiner* — Matthew Y Lee
(74) *Attorney, Agent, or Firm* — Burr Patent Law, PLLC

(57) ABSTRACT

An optical plastic product has an optical multilayer film formed on one or both surfaces of a base made of plastic, directly or via an intermediate film, wherein the optical multilayer film includes a tensile-stress high-refractive-index layer having tensile stress as internal stress and made of a high refractive index material, and a low refractive index layer made of a low refractive index material, and the tensile-stress high-refractive-index layer is disposed with a physical film thickness of not greater than 10 nm, in a first layer as counted from the base side in the optical multilayer film.

4 Claims, 4 Drawing Sheets

(51) Int. Cl.
B29D 11/00 (2006.01)
G02B 1/115 (2015.01)

(58) Field of Classification Search
CPC .. B29D 11/00788; G02C 7/022; G02C 7/107; G02C 7/02
See application file for complete search history.

(56) References Cited

U.S. PATENT DOCUMENTS

| | | | |
|---|---|---|---|
| 2006/0023311 A1 | 2/2006 | Scherer et al. | |
| 2009/0252862 A1 | 10/2009 | Inoue | |
| 2010/0238557 A1 | 9/2010 | Tomoda | |
| 2011/0229659 A1 | 9/2011 | Reynolds | |
| 2013/0222913 A1* | 8/2013 | Tomoda | C23C 14/24 |
| | | | 427/164 |
| 2014/0347625 A1* | 11/2014 | Tomoda | G02B 1/04 |
| | | | 351/159.01 |
| 2014/0376094 A1* | 12/2014 | Bellman | G02B 1/14 |
| | | | 428/428 |
| 2018/0067339 A1* | 3/2018 | Miyamoto | G02C 7/104 |

FOREIGN PATENT DOCUMENTS

| | | |
|---|---|---|
| CN | 104115037 A | 10/2014 |
| JP | 2005-534995 A1 | 11/2005 |
| JP | 2012-093689 A1 | 5/2012 |
| WO | 2008/023802 A1 | 2/2008 |
| WO | 2009/041580 A1 | 4/2009 |
| WO | 2010/016242 A1 | 2/2010 |
| WO | 2013/122253 A1 | 8/2013 |

OTHER PUBLICATIONS

Chinese Office Action (Application No. 201880044350.4) dated Dec. 10, 2021 (with English translation).
Chinese Office Action (Application No. 2018800443504) dated Dec. 3, 2020 (with English translation).

* cited by examiner

OPTICAL PLASTIC PRODUCT, AND PLASTIC SPECTACLE LENS AND SPECTACLES

This application is a Continuation of International Application No. PCT/JP2018/024050, filed on Jun. 25, 2018, which claims the benefit of Japanese Patent Application Number 2017-130579 filed on Jul. 3, 2017, the disclosures of which are incorporated by reference herein in their entireties.

BACKGROUND OF INVENTION

FIELD OF THE INVENTION

The present invention relates to optical plastic products such as plastic spectacle lenses (including sunglass lenses), and spectacles (including sunglasses) using the plastic spectacle lenses.

BACKGROUND OF THE INVENTION

Examples of plastic lenses that are excellent in reflection characteristics and heat resistance are disclosed in examples 2 and 3 of International Publication No. 2010/016242 (Patent Literature 1).

These lenses each have a thermosetting silicone-based hard coating layer and an antireflection film on a plastic base. The antireflection film is composed of four layers in total, with low refractive index layers and high refractive index layers layered alternately. The first layer closest to the plastic base is a zirconium dioxide layer formed as a high refractive index layer and having a physical film thickness of 11 nm (nanometer). The second and fourth layers are formed from silicon dioxide as a low refractive index layer. The total film thickness of the antireflection film is smaller than 200 nm (example 2: 174 nm, example 3: 170 nm).

SUMMARY OF THE INVENTION

Problems to be Solved by the Invention

In the above lenses, the physical film thickness of the first layer of the antireflection film is 11 nm. Therefore, there is a possibility that the antireflection film becomes brittle.

That is, the zirconium dioxide layer has tensile stress as internal stress, whereas the silicon dioxide layer, the plastic base, and the silicone-based hard coating layer have compressive stress as internal stress. Therefore, in many cases, unlike the above lenses, the first layer of the antireflection film that is adjacent to the hard coating layer is formed to be a silicon dioxide layer having compressive stress as in the plastic base. On the other hand, regarding adhesion to the hard coating layer, the zirconium dioxide layer is more excellent than the silicon dioxide layer. Then, if the first layer of the antireflection film is formed to be a zirconium dioxide layer having a physical film thickness of 11 nm considering the adhesion, tensile stress therein and compressive stress in the hard coating layer, which are actions contradicting each other, are retained inside the antireflection film and the hard coating film. In this case, for example, when lens shape processing for cutting the outer shape of a plastic spectacle lens so as to fit into the spectacle frame is performed by holding the plastic spectacle lens and a jig (lens lock cap) attached thereto between lens processing shafts, the antireflection film of the plastic spectacle lens might crack from a part held between the lens processing shaft and the jig, and thus the lens with the antireflection film might be weakened against external stress.

Accordingly, a main object of the present invention is to provide an optical plastic product, a plastic spectacle lens, and spectacles that have desired characteristics such as antireflection characteristics and are excellent in adhesion and external stress resistance.

Solution to the Problems

In order to achieve the above object, the invention of first aspect is an optical plastic product having an optical multilayer film disposed on one or both surfaces of a base made of plastic, directly or via an intermediate film, wherein the optical multilayer film includes a tensile-stress high-refractive-index layer having tensile stress as internal stress and made of a high refractive index material, and a low refractive index layer made of a low refractive index material, and the tensile-stress high-refractive-index layer is disposed with a physical film thickness of not greater than 10 nm, in a first layer as counted from the base side in the optical multilayer film.

In the invention of second aspect based on the above invention, in the optical multilayer film, a high refractive index layer made of a high refractive index material and the low refractive index layer may be disposed alternately.

In the invention of third aspect based on the above invention, the tensile-stress high-refractive-index layer may be a $ZrO_2$ layer.

In the invention of fourth aspect based on the above invention, a total physical film thickness of the optical multilayer film may not be less than 200 nm.

In the invention of fifth aspect based on the above invention, the intermediate film may be a hard coating film.

The invention of sixth aspect is a plastic spectacle lens using the above optical plastic product.

The invention of seventh aspect is spectacles using the above plastic spectacle lens.

Advantageous Effects of the Invention

A main effect of the present invention is to provide an optical plastic product and the like that have desired characteristics such as antireflection characteristics and are excellent in adhesion and external stress resistance.

DETAILED DESCRIPTION OF THE INVENTION

Figure 1:
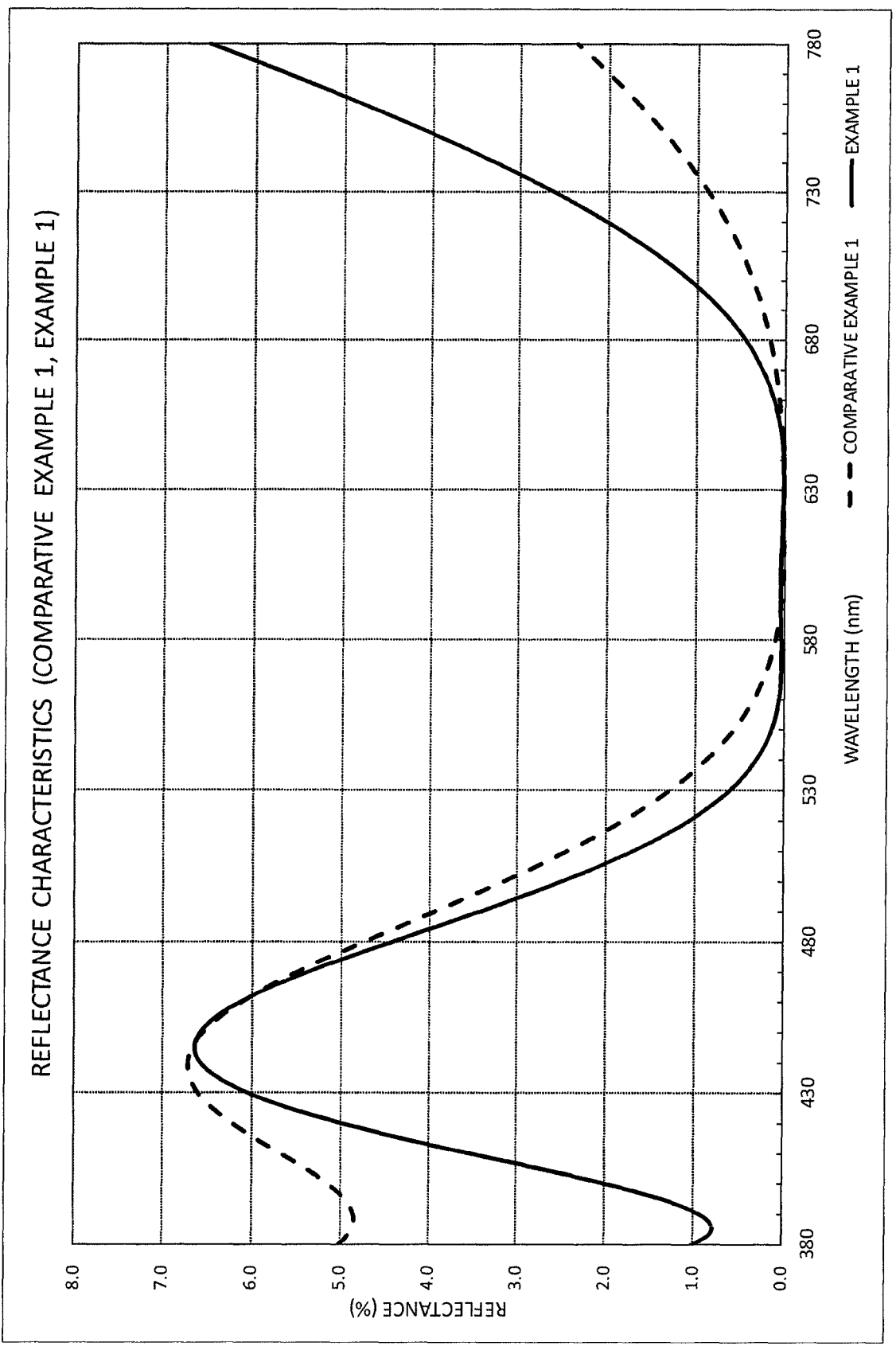
FIG. 1 is a graph showing reflectance distributions according to Example 1 and Comparative example 1.

Hereinafter, an exemplary embodiment according to the present invention will be described.

The present invention is not limited to the following embodiment.

An optical plastic product according to the present invention has an optical multilayer film formed on one or both surfaces of a base.

In the present invention, the base may be made of any material that is plastic, and preferably, is translucent. Preferably, the material of the base is a thermosetting resin, and examples thereof include polyurethane resin, thiourethane resin, urethane-urea resin, episulfide resin, polycarbonate resin, polyester resin, acrylic resin, polyether sulfone resin, poly(4-methylpentene-1) resin, diethylene glycol bis(allyl carbonate) resin, and a combination thereof. As a suitable example (for, in particular, a spectacle lens) having a high refractive index, an episulfide resin obtained by addition-polymerization of an episulfide group with polythiol and/or a sulfur-containing polyol, or a combination of the episulfide resin and another resin, may be used.

The optical multilayer film is provided in order to obtain desired characteristics such as antireflection characteristics and reflection intensifying characteristics. The configuration of the optical multilayer film is changed through changes of design matters such as selection of the numbers and the materials of high refractive index layers and low refractive index layers and increase/decrease in the thickness of each layer (physical film thickness or optical film thickness of layer). Preferably, the optical multilayer film is an inorganic multilayer film using a dielectric material, and has the following features as appropriate. In the case where the optical multilayer films are formed on both surfaces, preferably, both optical multilayer films have the following features, and further preferably, both optical multilayer films have the same layering structure.

That is, the optical multilayer film preferably has low refractive index layers and high refractive index layers layered alternately, and if the nearest layer to the base (the layer closest to the base) is defined as a first layer, the first layer is formed to be a high refractive index layer having tensile stress as internal stress, i.e., a tensile-stress high-refractive-index layer, and the physical film thickness thereof is not greater than 10 nm.

Such a high refractive index layer in the first layer is made from a high refractive index material such as zirconium oxide ($ZrO_2$), titanium oxide ($TiO_2$), tantalum oxide ($Ta_2O_5$), niobium oxide ($Nb_2O_5$), hafnium oxide ($HfO_2$), or a mixture of two or more kinds of these materials, and preferably, is made from $ZrO_2$. At present, typical high refractive index materials have tensile stress, except for selenium oxide ($CeO_2$).

Odd-numbered layers are high refractive index layers and are made from a high refractive index material similar to the first layer (tensile-stress high-refractive-index layer), a high refractive index material having compressive stress such as $CeO_2$ (compressive-stress high-refractive-index layer), or a mixture of these materials (mixed high refractive index layer).

Even-numbered layers are low refractive index layers and are made from a low refractive index material such as silicon oxide ($SiO_2$), aluminum oxide ($Al_2O_3$), calcium fluoride ($CaF_2$), magnesium fluoride ($MgF_2$), or a mixture of two or more kinds of these materials. At present, typical low refractive index materials have compressive stress, except for magnesium fluoride ($MgF_2$).

Alternatively, a high refractive index material having compressive stress such as $CeO_2$ may be provided in the second layer adjacent to the first layer. In this case, in the third layer, a high refractive index material may be provided or a low refractive index material may be provided. In the latter case, odd-numbered layers at the third and subsequent layers are low refractive index layers, and even-numbered layers are high refractive index layers. Similarly, in a layer adjacent to a high refractive index layer other than the first layer, a high refractive index layer made from another material may be provided, or in a layer adjacent to a low refractive index layer other than the first layer, a low refractive index layer made from another material may be provided.

The low refractive index layers and the high refractive index layers of the optical multilayer film are formed by a vacuum deposition method, an ion assisted deposition method, an ion plating method, a sputtering method, or the like.

From the viewpoint of ease of film designing and cost for film formation, it is preferable that two or less kinds of high refractive index materials and two or less kinds of low refractive index materials are used, and it is more preferable that one kind of high refractive index material and one kind of low refractive index material are used.

In the present invention, another type of film such as a hard coating film (HC film) or an antifouling film (water repellent film, oil repellent film) may be added between the optical multilayer film and the base and/or on a surface of the optical multilayer film. In the case where the optical multilayer films are formed on both surfaces, the types of films such as a hard coating film or an antifouling film to be added thereto may be different from each other, or whether such type of films is added or not on each surface may be selectable.

In the case where the HC film is provided as a film (intermediate film) added between the optical multilayer film and the base, the HC film is preferably formed by applying a hard coating solution uniformly on the surface of the base.

Preferably, the HC film is formed using an organosiloxane resin containing inorganic oxide particles (example of silicone-based HC film). Preferably, the organosiloxane resin is obtained by hydrolyzing and condensing an alkoxysilane. Specific examples of the organosiloxane resin include γ-glycidoxypropyltrimethoxysilane, γ-glycidoxypropyltriethoxysilane, methyl trimethoxysilane, ethyl silicate, and a combination thereof. Such hydrolysis condensates of alkoxysilanes are produced by hydrolyzing an alkoxysilane compound or a combination of the compounds by an acidic aqueous solution such as hydrochloric acid.

Specific examples of a material of the inorganic oxide particles include a sol of each of zinc oxide, silicon dioxide (silica particulates), aluminum oxide, titanium oxide (titania particulates), zirconium oxide (zirconia particulates), tin oxide, beryllium oxide, antimony oxide, tungsten oxide, and cerium oxide, and mixed crystals of two or more of these sols. From the viewpoint of assuring transparency of the HC film, it is preferable that the diameter of the inorganic oxide particle is not less than 1 nm and not greater than 100 nm, and it is more preferable that the diameter is not less than 1 nm and not greater than 50 nm. From the viewpoint of assuring hardness and toughness of the HC film at an appropriate level, it is preferable that the amount (concentration) of the inorganic oxide particles to be blended is not less than 40% by weight and not greater than 60% by weight of all the components of the HC film. In addition, the hard coating solution may contain at least one of an acetylacetone metal salt and an ethylenediaminetetraacetic acid metal salt, or the like, as a curing catalyst. Furthermore, the hard coating solution may contain a surfactant, a colorant, a solvent, or the like, as necessary for, for example, assuring adhesion to the base, facilitating formation, and coloring with a desired (semi)transparent color.

On the other hand, the HC film may be formed using an acrylic resin (acrylic HC film). In this case, preferably, the HC film is formed by applying ultraviolet (UV) rays to a UV-curable acrylic resin which is cured by being irradiated with UV rays.

The HC film preferably has a physical film thickness of not less than 0.5 μm (micrometer) and not greater than 4.0 μm. The lower limit of the film thickness range is determined since it is difficult to obtain a sufficient hardness if the film thickness is less than this lower limit. Meanwhile, the upper limit thereof is determined since a possibility of causing a problem with physical properties such as occurrence of crack or brittleness is significantly increased if the film thickness is greater than this upper limit.

Further, a primer film may be added between the HC film and the surface of the base, from the viewpoint of improving adhesion of the HC film. Examples of a material of the primer film include polyurethane-based resin, acrylic resin, methacrylic resin, organosilicon resin, and a combination thereof. The primer film is preferably formed by applying a primer solution uniformly on the surface of the base. The primer solution is a solution obtained by mixing the resin material and the inorganic oxide particles in water or alcohol-based solvent.

The plastic base and the HC film as described above have compressive stress as internal stress. If the first layer of the optical multilayer film that comes into contact with the plastic base or the HC film is a high refractive index layer having tensile stress, adhesion thereof to the base or the HC film is improved as compared to the case where the first layer is a low refractive index layer having compressive stress. However, compressive stress and tensile stress which are internal stresses contradicting each other are retained, and thus, depending on the film configuration, the structure is weakened against external stress.

In the optical multilayer film of the present invention, the physical film thickness of the first layer which is a high refractive index layer having tensile stress is not greater than 10 nm. Therefore, the magnitude of the retained tensile stress per unit area is not greater than a predetermined level, and even if the layer is in contact with the base or the HC film having compressive stress, the levels of the internal stresses contradicting each other can be reduced. Further, even though the physical film thickness of the first layer is not greater than 10 nm, the fact remains that the first layer which is a high refractive index layer having tensile stress is in contact with the base or the HC film. Therefore, adhesion between the optical multilayer film and the base or the HC film is maintained.

In the optical multilayer film, preferably, a total physical film thickness which is the sum of the physical film thicknesses of the respective layers is not less than 200 nm, from the following viewpoint. That is, in the case where the total physical film thickness is great to this extent, it is difficult to assure internal stress balance in the optical multilayer film based on the internal stresses of the respective layers, and thus, in this state, it is difficult to assure adhesion of the optical multilayer film. However, since the high refractive index layer in the first layer is provided as described above, adhesion is assured even in such a thick optical multilayer film. Since adhesion of the optical multilayer film is assured, resistance to external stress is improved in an optical plastic product with the optical multilayer film, and thus occurrence of crack (cracking) in the optical multilayer film or the like due to pressure or stress applied at the time of processing for the optical plastic product or the like is prevented.

Preferably, the base is a plastic spectacle lens base, and the optical plastic product is a plastic spectacle lens.

In the case where the optical plastic product is a plastic spectacle lens, occurrence of crack (cracking) in the optical multilayer film or the like at the time of lens shape processing therefor is prevented.

In addition, it is possible to manufacture spectacles using the plastic spectacle lens.

EXAMPLES

Next, Examples 1 to 4 of the present invention and Comparative examples 1 to 6 which do not belong to the present invention will be described, with reference to the drawings as necessary.

The present invention is not limited to the following Examples. In addition, depending on interpretation of the present invention, the following Examples may be substantially regarded as Comparative examples, or the following Comparative examples may be substantially regarded as Examples.

<<Base and Intermediate Film, Etc.>>

The Examples and Comparative examples all relate to plastic spectacle lenses. The bases thereof are all made from thermosetting resins, and are spherical lens bases having round shapes in standard sizes as plastic lenses for spectacles, with the power of S-0.00. More specifically, each base is one of the following two types.

That is, first bases are made from thiourethane resin, the refractive index thereof is 1.60, and the Abbe number thereof is 41 (thiourethane base). The first bases are used in Examples 1 to 3 and Comparative examples 1 to 5.

Second bases are made from acrylic resin, the refractive index thereof is 1.49, and the Abbe number thereof is 58 (acrylic base). The second bases are used in Example 4 and Comparative example 6.

In the Examples and Comparative examples, HC films are formed as intermediate films on both surfaces of a base by applying a hard coating solution.

More specifically, each of the HC films in contact with the plastic spectacle lens bases is one of the following two types.

That is, first HC films are silicone-based thermosetting hard coating films, and all have a physical film thickness of 2.5 μm (silicone-based HC film). The silicone-based HC films have a refractive index of 1.60, and are used in Examples 1, 2 and Comparative examples 1 to 3.

Second HC films are acrylic UV-curable hard coating films, and all have a physical film thickness of 2.0 μm (acrylic HC film). The acrylic HC films are used in Example 3, 4 and Comparative examples 4 to 6.

<<Optical Multilayer Film, Etc.>>

In the Examples and Comparative examples (except for Comparative example 4), optical multilayer films having the same structure were formed on the intermediate films on both surfaces of each base.

In each optical multilayer film, high refractive index layers are $ZrO_2$ layers, and low refractive index layers are $SiO_2$ layers (inorganic multilayer film), and in Examples 1 to 4 and Comparative examples 1 to 6 (except for Comparative example 4), the physical film thickness and the optical film thickness of each layer are as shown in the column of "layer configuration" in [Table 1] to [Table 4] below. More specifically, "the physical film thickness" and the like in Example 1 and Comparative example 1 are shown at the upper part of [Table 1], "the physical film thickness" and the like in Example 2, Comparative example 2, and Comparative example 3 are shown at the upper part of [Table 2], "the physical film thickness" and the like in Example 3, Comparative example 4, and Comparative example 5 are shown at the upper part of [Table 3], and "the physical film thickness" and the like in Example 4 and Comparative example 6 are shown at the upper part of [Table 4].

It is noted that the refractive index of the $ZrO_2$ layer is 2.034 at a wavelength of 500 nm, and the refractive index of the $SiO_2$ layer is 1.469 at a wavelength of 500 nm. In addition, the optical film thickness is indicated by a value at a designing wavelength of $\lambda=500$ nm.

TABLE 1

|  |  | Comparative example 1 | | | Example 1 | | |
| --- | --- | --- | --- | --- | --- | --- | --- |
|  |  | Material | Physical film thickness | Optical film thickness | Material | Physical film thickness | Optical film thickness |
| Layer configuration | First layer | SiO$_2$ | 167.95 | 0.493λ | ZrO$_2$ | 9.20 | 0.037λ |
|  | Second layer | ZrO$_2$ | 12.23 | 0.050λ | SiO$_2$ | 33.22 | 0.098λ |
|  | Third layer | SiO$_2$ | 34.72 | 0.102λ | ZrO$_2$ | 17.00 | 0.069λ |
|  | Fourth layer | ZrO$_2$ | 91.83 | 0.374λ | SiO$_2$ | 215.06 | 0.632λ |
|  | Fifth layer | SiO$_2$ | 98.29 | 0.290λ | ZrO$_2$ | 109.76 | 0.447λ |
|  | Sixth layer | — | — | — | SiO$_2$ | 85.48 | 0.251λ |
|  |  | — | — | — | — | — | — |
|  |  | — | — | — | — | — | — |
|  |  | — | — | — | — | — | — |
|  |  | — | — | — | — | — | — |
|  | Total film thickness |  | 404.12 nm |  |  | 469.72 nm |  |
| Evaluation | Weather-resistance and adhesion | Initial | 100 |  | Initial | 100 |  |
|  |  | 60 hr. | 99.5 |  | 60 hr. | 100 |  |
|  |  | 120 hr. | 99 |  | 120 hr. | 100 |  |
|  |  | 180 hr. | 95 |  | 180 hr. | 100 |  |
|  |  | 240 hr. | 95 |  | 240 hr. | 100 |  |
|  | Crack prevention in lens shape processing |  | Successful |  |  | Successful |  |

TABLE 2

|  |  | Comparative example 2 | | | Comparative example 3 | | | Example 2 | | |
| --- | --- | --- | --- | --- | --- | --- | --- | --- | --- | --- |
|  |  | Material | Physical film thickness | Optical film thickness | Material | Physical film thickness | Optical film thickness | Material | Physical film thickness | Optical film thickness |
| Layer configuration | First layer | SiO$_2$ | 20.00 | 0.059λ | ZrO$_2$ | 15.00 | 0.061λ | ZrO$_2$ | 8.50 | 0.035λ |
|  | Second layer | ZrO$_2$ | 32.76 | 0.133λ | SiO$_2$ | 65.00 | 0.191λ | SiO$_2$ | 25.00 | 0.073λ |
|  | Third layer | SiO$_2$ | 226.82 | 0.665λ | ZrO$_2$ | 32.71 | 0.133λ | ZrO$_2$ | 33.15 | 0.135λ |
|  | Fourth layer | ZrO$_2$ | 23.71 | 0.095λ | SiO$_2$ | 209.86 | 0.616λ | SiO$_2$ | 231.74 | 0.681λ |
|  | Fifth layer | SiO$_2$ | 20.37 | 0.060λ | ZrO$_2$ | 20.89 | 0.085λ | ZrO$_2$ | 27.13 | 0.110λ |
|  | Sixth layer | ZrO$_2$ | 47.35 | 0.193λ | SiO$_2$ | 31.20 | 0.092λ | SiO$_2$ | 19.77 | 0.058λ |
|  | Seventh layer | SiO$_2$ | 214.11 | 0.629λ | ZrO$_2$ | 68.19 | 0.277λ | ZrO$_2$ | 39.27 | 0.160λ |
|  | Eighth layer | ZrO$_2$ | 102.14 | 0.416λ | SiO$_2$ | 212.81 | 0.625λ | SiO$_2$ | 213.30 | 0.627λ |
|  | Ninth layer | SiO$_2$ | 102.27 | 0.309λ | ZrO$_2$ | 106.41 | 0.433λ | ZrO$_2$ | 102.16 | 0.416λ |
|  | Tenth layer | — | — | — | SiO$_2$ | 102.48 | 0.301λ | SiO$_2$ | 104.39 | 0.307λ |
|  | Total film thickness |  | 789.53 nm |  |  | 864.55 nm |  |  | 804.41 nm |  |
| Evaluation | Weather-resistance and adhesion | Initial | 100 |  | Initial | 100 |  | Initial | 100 |  |
|  |  | 60 hr. | 99.5 |  | 60 hr. | 100 |  | 60 hr. | 100 |  |
|  |  | 120 hr. | 98 |  | 120 hr. | 100 |  | 120 hr. | 100 |  |
|  |  | 180 hr. | 98 |  | 180 hr. | 100 |  | 180 hr. | 100 |  |
|  |  | 240 hr. | 98 |  | 240 hr. | 100 |  | 240 hr. | 100 |  |
|  | Crack prevention in lens shape processing |  | Successful |  |  | Failed |  |  | Successful |  |

TABLE 3

| | | Comparative example 4 | | | Comparative example 5 | | | | Example 3 | | |
|---|---|---|---|---|---|---|---|---|---|---|---|
| | | Material | Film thickness | | Material | Physical film thickness | Optical film thickness | | Material | Physical film thickness | Optical film thickness |
| Layer configuration | First layer | Hard coating only (No inorganic multilayer film) | | First layer | SiO$_2$ | 25.00 | 0.073λ | First layer | ZrO$_2$ | 6.50 | 0.026λ |
| | Second layer | | | Second layer | ZrO$_2$ | 39.26 | 0.160λ | Second layer | SiO$_2$ | 23.67 | 0.070λ |
| | Third layer | | | Third layer | SiO$_2$ | 22.99 | 0.068λ | Third layer | ZrO$_2$ | 47.61 | 0.194λ |
| | Fourth layer | | | Fourth layer | ZrO$_2$ | 48.75 | 0.198λ | Fourth layer | SiO$_2$ | 12.35 | 0.036λ |
| | Fifth layer | | | Fifth layer | SiO$_2$ | 97.90 | 0.288λ | Fifth layer | ZrO$_2$ | 55.92 | 0.227λ |
| | Sixth layer | | | — | — | — | — | Sixth layer | SiO$_2$ | 92.42 | 0.272λ |
| | Seventh layer | | | — | — | — | — | — | — | — | — |
| | Eighth layer | | | — | — | — | — | — | — | — | — |
| | Ninth layer | | | — | — | — | — | — | — | — | — |
| | Tenth layer | | | — | — | — | — | — | — | — | — |
| | Total film thickness | | | Total film thickness | | 233.90 nm | | Total film thickness | | 238.47 nm | |
| Evaluation | Weather-resistance and adhesion | Initial | 98 | Weather-resistance and adhesion | Initial | | 100 | Weather-resistance and adhesion | Initial | | 100 |
| | | 60 hr. | 75 | | 60 hr. | | 97 | | 60 hr. | | 99 |
| | | 120 hr. | 50 | | 120 hr. | | 80 | | 120 hr. | | 97 |
| | | 180 hr. | Evaluation finished | | 180 hr. | | 30 | | 180 hr. | | 96 |
| | | 240 hr. | Evaluation finished | | 240 hr. | | 20 | | 240 hr. | | 88 |
| | Crack prevention in lens shape processing | | Not conducted | Crack prevention in lens shape processing | | | Successful | Crack prevention in lens shape processing | | | Successful |

TABLE 4

| | | Comparative example 6 | | | Example 4 | | |
|---|---|---|---|---|---|---|---|
| | | Material | Physical film thickness | Optical film thickness | Material | Physical film thickness | Optical film thickness |
| Layer configuration | First layer | SiO$_2$ | 40.00 | 0.118λ | ZrO$_2$ | 7.50 | 0.031λ |
| | Second layer | ZrO$_2$ | 21.31 | 0.087λ | SiO$_2$ | 40.00 | 0.118λ |
| | Third layer | SiO$_2$ | 26.89 | 0.079λ | ZrO$_2$ | 19.26 | 0.078λ |
| | Fourth layer | ZrO$_2$ | 130.45 | 0.531λ | SiO$_2$ | 16.81 | 0.049λ |
| | Fifth layer | SiO$_2$ | 157.64 | 0.463λ | ZrO$_2$ | 135.08 | 0.550λ |
| | Sixth layer | ZrO$_2$ | 108.24 | 0.440λ | SiO$_2$ | 160.26 | 0.471λ |
| | Seventh layer | SiO$_2$ | 75.22 | 0.221λ | ZrO$_2$ | 108.78 | 0.443λ |
| | — | — | — | — | Eighth layer | SiO$_2$ | 73.97 | 0.217λ |
| | — | — | — | — | — | — | — | — |
| | Total film thickness | | 559.75 nm | | Total film thickness | | 561.66 nm | |
| Evaluation | Weather-resistance and adhesion | Initial | 98 | | Weather-resistance and adhesion | Initial | 98 | |
| | | 60 hr. | 20 | | | 60 hr. | 99.5 | |
| | | 120 hr. | 50 | | | 120 hr. | 99 | |
| | | 180 hr. | 5 | | | 180 hr. | 96 | |
| | | 240 hr. | 10 | | | 240 hr. | 98 | |
| | Crack prevention in lens shape processing | | Successful | | Crack prevention in lens shape processing | | Successful | |

That is, in Example 1 and Comparative example 1, the optical multilayer films were designed to be antireflection films in which, in a visible region (here, not less than 400 nm and not greater than 780 nm) and a neighboring region (here, not less than 380 nm, but less than 400 nm), the reflectance (local maximum: around 6.8%) in a region around a wavelength of 450 nm was greater than the one in the other region. The optical multilayer film in Example 1 is composed of six layers in total, and the optical multilayer film in Comparative example 1 is composed of five layers in total. The reflectance distributions thereof in the above wavelength region are shown in FIG. 1.

In Example 1, the first layer closest to the base and adjacent to the HC film is a $ZrO_2$ layer having a physical film thickness of 9.20 nm, and the total physical film thickness is 469.72 nm.

In Comparative example 1, the first layer is an $SiO_2$ layer having a physical film thickness of 167.05 nm, and the total physical film thickness is 404.12 nm.

Figure 2:
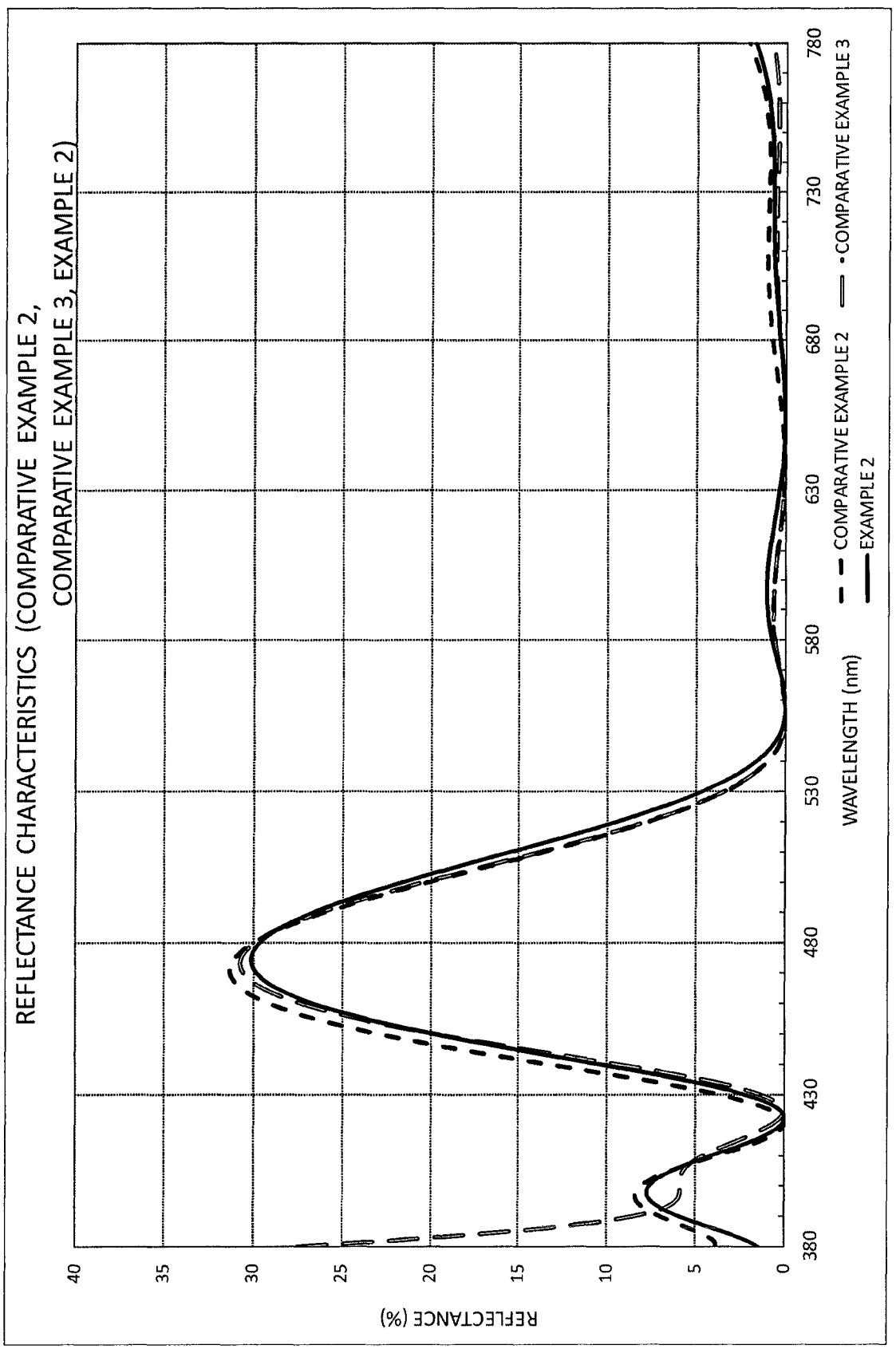
FIG. 2 is a graph showing reflectance distributions according to Example 2 and Comparative examples 2, 3.

In Example 2 and Comparative examples 2, 3, the optical multilayer films were designed to be antireflection films in which, in the above wavelength region, the reflectance (local maximum: around 30%) in a region around a wavelength of 480 nm was greater than the one in the other region. The optical multilayer film in Example 2 is composed often layers in total, the optical multilayer film in Comparative example 2 is composed of nine layers in total, and the optical multilayer film in Comparative example 3 is composed often layers in total. The reflectance distributions thereof in the above wavelength region are shown in FIG. 2.

In Example 2, the first layer is a $ZrO_2$ layer having a physical film thickness of 8.50 nm, and the total physical film thickness is 804.41 nm.

In Comparative example 2, the first layer is an $SiO_2$ layer having a physical film thickness of 20.00 nm, and the total physical film thickness is 789.53 nm.

In Comparative example 3, the first layer is a $ZrO_2$ layer having a physical film thickness of 15.00 nm, and the total physical film thickness is 864.55 nm.

Figure 3:
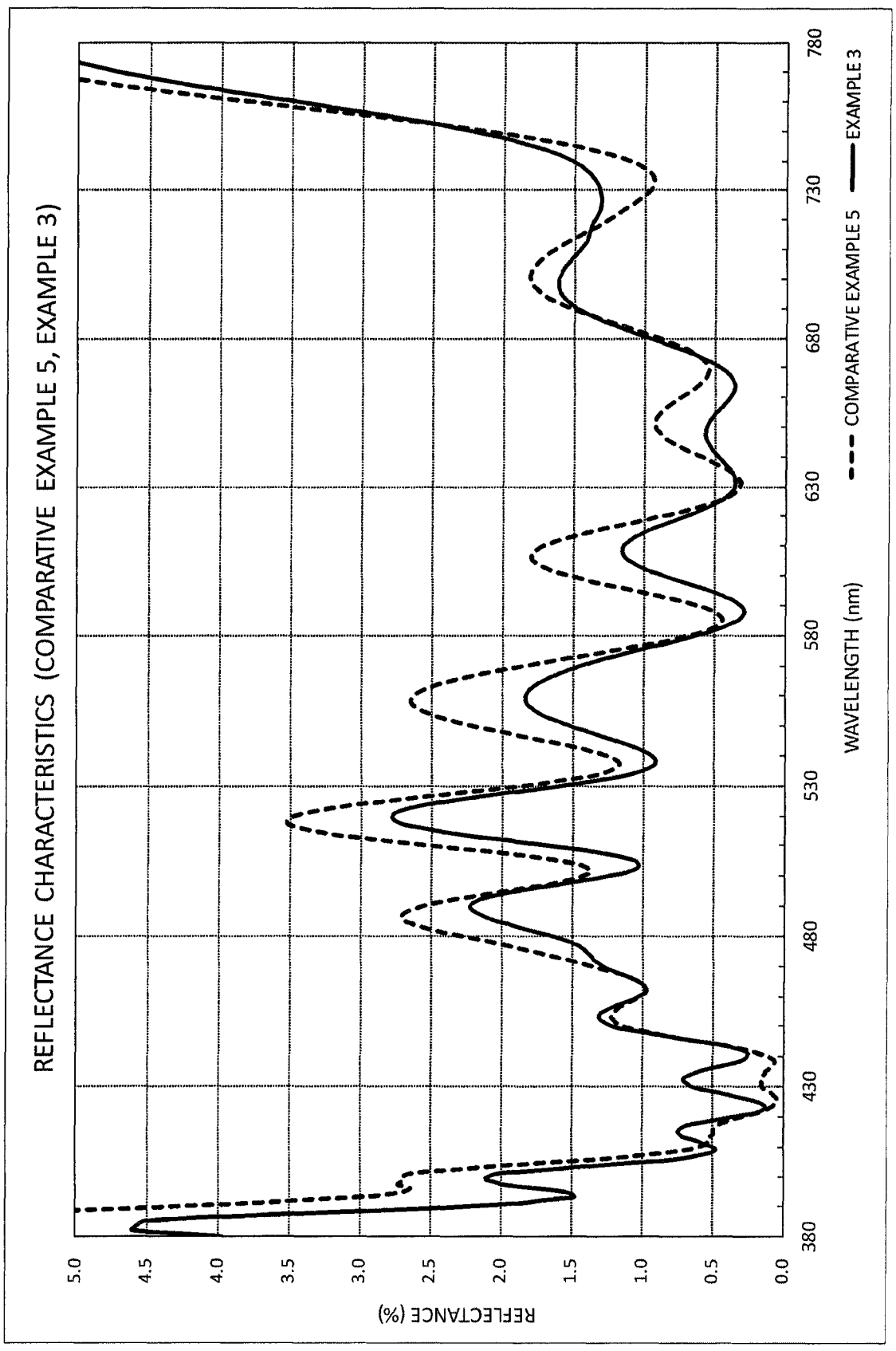
FIG. 3 is a graph showing reflectance distributions according to Example 3 and Comparative example 5.

In Example 3 and Comparative example 5, an acrylic HC film was formed on a thiourethane base, and each optical multilayer film was designed to have antireflection characteristics in the visible region. The optical multilayer film in Example 3 is composed of six layers in total, and the optical multilayer film in Comparative example 5 is composed of five layers in total. The reflectance distributions thereof in the above wavelength region are shown in FIG. 3. Since the refractive index differs between the thiourethane base and the acrylic HC film, ripples (waves) occur in the reflectance distributions.

In Example 3, the first layer is a $ZrO_2$ layer having a physical film thickness of 6.50 nm, and the total physical film thickness is 238.47 nm.

In Comparative example 5, the first layer is an $SiO_2$ layer having a physical film thickness of 25.00 nm, and the total physical film thickness is 233.90 nm.

It is noted that Comparative example 4 is an example in which an acrylic HC film was formed on a thiourethane base, and is equal to an example obtained by removing the optical multilayer film in Example 3 or Comparative example 5.

Figure 4:
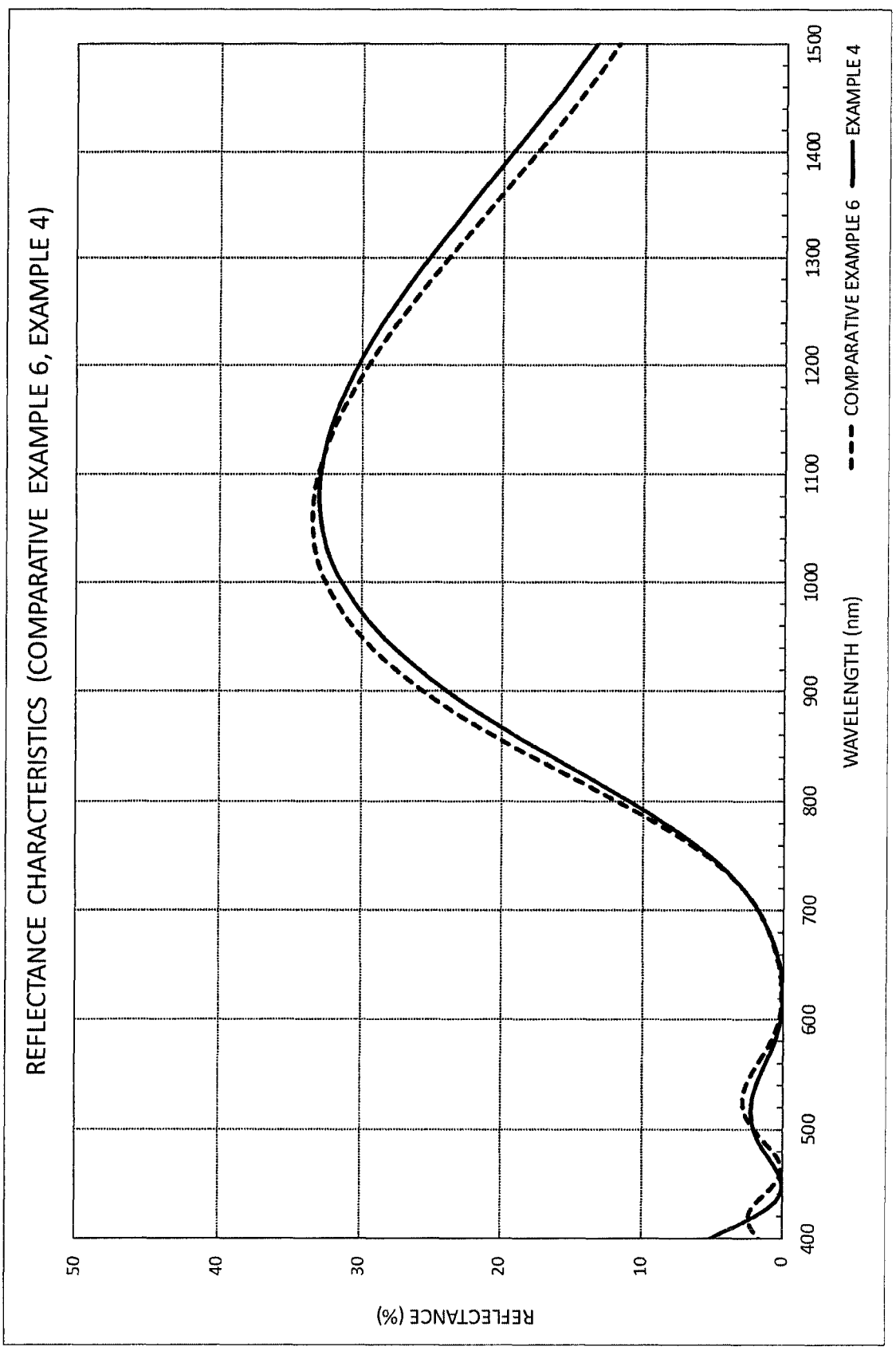
FIG. 4 is a graph showing reflectance distributions according to Example 4 and Comparative example 6.

In Example 4 and Comparative example 6, an acrylic HC film was formed on an acrylic base, and each optical multilayer film was designed to have antireflection characteristics in the visible region and have near-infrared reflection characteristics in a near infrared region (here, wavelength region exceeding 780 nm) (in the reflectance distribution, a local maximum is about 35% at a wavelength of around 1040 nm). The optical multilayer film in Example 4 is composed of eight layers in total, and the optical multilayer film in Comparative example 6 is composed of seven layers in total. The reflectance distributions thereof in a wavelength region including the visible region and an infrared region not greater than 1500 nm are shown in FIG. 4.

In Example 4, the first layer is a $ZrO_2$ layer having a physical film thickness of 7.50 nm, and the total physical film thickness is 561.66 nm.

In Comparative example 6, the first layer is an $SiO_2$ layer having a physical film thickness of 40.00 nm, and the total physical film thickness is 559.75 nm.

<<Weather-Resistance and Adhesion Test, External Stress Resistance Test, Etc.>>

A weather-resistance and adhesion test was conducted in order to evaluate adhesion of the optical multilayer film (in Comparative example 4, HC film) in each of the above Examples and Comparative examples.

The weather-resistance and adhesion test was conducted as follows.

First, on each surface of the lens, 100 cells were formed by a cutter such that each cell is a square with the size of each side being 10 mm (millimeter).

Next, adhesion and vigorous peeling of a cellophane tape on the cell-formed part were repeated five times, and the number of cells where peeling did not occur was confirmed (initial confirmation). Peeling for half a cell was counted as 0.5 cells.

Subsequently, to accelerate the test, the lens was placed in a sunshine weather meter (S80B manufactured by Suga Test Instruments Co., Ltd.) for 60 hours (hr.). Then, in the same manner as before the placement, the number of cells where peeling was not caused was counted after applying a cellophane tape to a cell-formed part that had been newly formed (confirmation at 60 hr.).

Thereafter, in the same manner, the lens was placed in the sunshine weather meter for 60 hours and the number of cells where peeling did not occur was confirmed (confirmation at 120 hr. in total). Such placement and confirmation were repeated every 60 hours until confirmation after the lens had been placed for 240 hours in total since the initial placement (confirmation at 180 hr., confirmation at 240 hr.).

A result of this test is shown in the column of "weather-resistance and adhesion" in the above [Table 1] to [Table 4].

In addition, an external stress resistance test was conducted in order to evaluate durability against external stress in the optical multilayer film in each of the above Examples and Comparative examples, except for Comparative example 4 having no optical multilayer film. The external stress resistance test was conducted in relation to lens shape processing as follows.

That is, the lens was set on a lens shape processing machine (edger) and was subjected to lens shape processing.

More specifically, the edger includes a grindstone that is movable and is rotatable about its axis, and a pair of lens processing shafts. The lens to which a jig (lens lock cap) was attached on one surface (convex surface) thereof by a double sided tape was set in a state of being positioned by the jig so as to be held between the lens processing shafts, and the grindstone rotated as appropriate was moved to be applied to an outer peripheral part of the set lens, whereby the round lens was processed into a substantially elliptic lens shape so as to be fitted into a spectacle frame.

In such lens shape processing, external stress is most applied to a part of the lens that comes into contact with the lens processing shaft or the jig, or a part adjacent thereto. In the external stress resistance test, whether or not occurrence of crack (cracking) was prevented in the lens shape processing was confirmed.

A result of this test is shown in the column of "crack prevention in lens shape processing" in the above [Table 1] to [Table 4].

In the lens shape processing, if occurrence of crack was prevented, "Successful" is indicated in this column, and if crack occurred, "Failed" is indicated in this column.

In both Example 1 and Comparative example 1, characteristics of causing reflection at a wavelength of around 450 nm were exhibited, and occurrence of crack in the lens shape processing was prevented and thus external stress resistance was exhibited. However, the results of the weather-resistance and adhesion test were different between Example 1 and Comparative example 1.

That is, in Comparative example 1, although peeling did not occur initially (no peeling in 100 cells), half a cell was peeled at 60 hr. (no peeling in 99.5 cells), one cell was peeled at 120 hr. (no peeling in 99 cells), and five cells were peeled at 180 hr. and later (no peeling in 95 cells).

In contrast, in Example 1, peeling had not occurred until elapse of 240 hr.

Such a difference is due to the following reason. In Comparative example 1, the first layer of the optical multilayer film is an $SiO_2$ layer and has compressive stress as in the HC film, thus exhibiting an effect of preventing crack in the lens shape processing, but adhesion to the HC film is relatively poor. On the other hand, in Example 1, the first layer of the optical multilayer film is a $ZrO_2$ layer, and thus adhesion to the HC film is relatively excellent.

Further, in Example 1, since the physical film thickness of the first layer of the optical multilayer film is not greater than 10 nm (9.20 nm), tensile stress in the first layer is small. Therefore, Example 1 has an effect of preventing crack in the lens shape processing and has external stress resistance.

Example 2 and Comparative examples 2, 3 all have characteristics of causing reflection at a wavelength of around 480 nm, but are different in the results of the weather-resistance and adhesion test and the results of the external stress resistance test.

That is, in Comparative example 2, in the external stress resistance test, crack did not occur in the lens shape processing, but in the weather-resistance and adhesion test, half a cell was peeled at 60 hr., and two cells were peeled at 120 hr. and later.

In Comparative example 3, peeling did not occur in the weather-resistance and adhesion test, but crack occurred in the external stress resistance test.

In contrast to these, in Example 2, peeling had not occurred until elapse of 240 hr. in the weather-resistance and adhesion test, and occurrence of crack was prevented in the external stress resistance test.

Such a difference is considered to be due to the following reason. That is, in Comparative example 2, the first layer of the optical multilayer film is an $SiO_2$ layer and has compressive stress as in the HC film, thus exhibiting an effect of preventing crack in the lens shape processing, but adhesion to the HC film is relatively poor. In Comparative example 3, the first layer of the optical multilayer film is a $ZrO_2$ layer, and thus adhesion to the HC film is relatively excellent. However, the physical film thickness of the first layer is greater than 10 nm (15.00 nm), so that tensile stress in the first layer is relatively great and thus contradicts compressive stress in the HC film to a relatively great extent. Therefore, cracking occurs when great external stress is applied as in lens shape processing. In contrast to these, in Example 2, the first layer of the optical multilayer film is a $ZrO_2$ layer and thus adhesion to the HC film is relatively excellent. Further, the physical film thickness is not greater than 10 nm (8.50 nm) and thus tensile stress is small, so that Example 2 has external stress resistance and has an effect of preventing crack in lens shape processing.

Example 3 and Comparative examples 4, 5 all have acrylic HC films on thiourethane bases, and Example 3 and Comparative example 5 further have optical multilayer films having reflectance distributions similar to each other, on the HC films.

In the weather-resistance and adhesion test in Comparative example 4, a half number of cells in the HC film were peeled at 120 hr., and thus it was indicated that adhesion of the acrylic HC film to the thiourethane base was relatively poor. Therefore, the rest of the weather-resistance and adhesion test and the external stress resistance test were not conducted.

In Comparative example 5, crack did not occur in the external stress resistance test, but in the weather-resistance and adhesion test, 80 cells were peeled at 240 hr., and thus it was indicated that adhesion of the optical multilayer film to the HC film was relatively poor.

In contrast to these, in Example 3, 12 cells were peeled at 240 hr. in the weather-resistance and adhesion test, and occurrence of crack was prevented in the external stress resistance test.

In Example 3, the first layer of the optical multilayer film is a $ZrO_2$ layer and thus adhesion to the acrylic HC film is dramatically improved as compared to Comparative example 5 (the first layer of the optical multilayer film is an $SiO_2$ layer and 80 cells were peeled at 240 hr. in the weather-resistance and adhesion test).

Even if adhesion between the HC film and the base is relatively poor as indicated in Comparative example 4, weather resistance and adhesion in the entire plastic lens are improved by further formation of the optical multilayer film in Example 3. In Example 3, the physical film thickness of the first layer of the optical multilayer film is not greater than 10 nm (6.50 nm). Therefore, occurrence of crack was prevented in the lens shape processing, and external stress resistance was also high.

Example 4 and Comparative example 6 both have acrylic HC films and optical multilayer films on acrylic bases, and thus have antireflection characteristics in a visible region and reflection characteristics in a near infrared region.

In Comparative example 6, the first layer of the optical multilayer film is an $SiO_2$ layer, and thus occurrence of crack was suppressed in the external stress resistance test, but 95 cells at maximum (180 hr.) were peeled in the weather-resistance and adhesion test.

In contrast, in Example 4, the first layer of the optical multilayer film is a $ZrO_2$ layer, and four cells at maximum (180 hr.) were peeled in the weather-resistance and adhesion test, thus exhibiting great improvement. In addition, since the physical film thickness of the first layer is not greater than 10 nm (7.50 nm), occurrence of crack was prevented in the lens shape processing and external stress resistance was also high.

In Examples 3, 4, the results of the weather-resistance and adhesion tests are slightly worse than the results in Examples 1, 2. However, in Examples 1, 2, a thiourethane base and a silicone-based HC film are used, and therefore the cost for materials and formation is relatively high. Example 3 (thiourethane base and acrylic HC film) and Example 4 (acrylic base and acrylic HC film) have advantages in terms of cost.

As described above, if the first layer on the base side in the optical multilayer film is a high refractive index layer which has a physical film thickness of not greater than 10 nm and has tensile stress as in Examples 1 to 4, desired characteristics are achieved, and adhesion and external stress resistance are both achieved.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. An optical plastic product comprising, in this order:
    a plastic base;
    a hard coating film, provided immediately adjacent to at least one surface of the plastic base; and
    an optical multilayer film disposed on one or both surfaces of the plastic base, directly or via the hard coating film,
    wherein the optical multilayer film consists of 8 alternating layers of a tensile-stress high-refractive-index layer having tensile stress as internal stress and made of a high refractive index material, and a low refractive index layer made of a low refractive index material,
    wherein the hard coating film comprises an organosiloxane resin,
    wherein the tensile-stress high-refractive-index layer of the optical multilayer film is disposed with a physical film thickness of not greater than 7.5 nm, in a first layer as counted from the plastic base side,
    wherein a total physical film thickness of the optical multilayer film is not less than 561.66 nm, and
    wherein the plastic base or the hard coating film adjacent the first layer of the optical multilayer film has compressive stress as an internal stress.

2. The optical plastic product according to claim 1, wherein the tensile-stress high-refractive-index layer is a $ZrO_2$ layer.

3. A plastic spectacle lens using the optical plastic product according to claim 1.

4. Spectacles using the plastic spectacle lens according to claim 3.

* * * * *